(12) United States Patent
Fogash et al.

(10) Patent No.: US 8,327,779 B2
(45) Date of Patent: Dec. 11, 2012

(54) COMBUSTION SYSTEM WITH STEAM OR WATER INJECTION

(75) Inventors: Kevin Boyle Fogash, Wescosville, PA (US); Xianming Jimmy Li, Orefield, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 978 days.

(21) Appl. No.: 12/238,632

(22) Filed: Sep. 26, 2008

(65) Prior Publication Data

US 2010/0077943 A1   Apr. 1, 2010

(51) Int. Cl.
*F23J 15/06* (2006.01)
(52) U.S. Cl. ........ 110/345; 110/215; 110/348; 261/143; 261/152; 261/118
(58) Field of Classification Search ............ 110/215, 110/344, 345, 348, 346; 261/118, 143, 152
See application file for complete search history.

(56) References Cited

U.S. PATENT DOCUMENTS

| | | | |
|---|---|---|---|
| 3,700,035 A | 10/1972 | Lange | |
| 4,089,639 A | 5/1978 | Reed et al. | |
| 4,312,301 A * | 1/1982 | Anson | 110/347 |
| 4,869,209 A | 9/1989 | Young | |
| 4,888,162 A | 12/1989 | Brian | |
| 4,957,050 A * | 9/1990 | Ho | 110/346 |
| 5,333,574 A | 8/1994 | Brady et al. | |
| 5,746,144 A | 5/1998 | Breen et al. | |
| 5,832,846 A | 11/1998 | Mankowski et al. | |
| 6,311,647 B1 | 11/2001 | Liebig et al. | |
| 6,314,896 B1 | 11/2001 | Marin et al. | |
| 6,832,566 B2 * | 12/2004 | Gross et al. | 110/346 |
| 6,848,374 B2 * | 2/2005 | Srinivasachar et al. | 110/345 |
| 6,935,251 B2 * | 8/2005 | Marin et al. | 110/204 |
| 6,962,117 B2 | 11/2005 | Barry | |
| 7,043,920 B2 | 5/2006 | Viteri et al. | |
| 7,335,014 B2 | 2/2008 | Higgins | |
| 2004/0238654 A1 | 12/2004 | Hagen et al. | |

FOREIGN PATENT DOCUMENTS

| | | |
|---|---|---|
| DE | 199 01 656 A1 | 7/2000 |
| EP | 1 517 085 A2 | 3/2005 |
| EP | 1844842 A2 | 12/2007 |
| WO | 2007/028711 A1 | 3/2007 |
| WO | 2007/036236 A1 | 4/2007 |

(Continued)

OTHER PUBLICATIONS

Mark Daniel D'Agostini, Oxy/Fuel Combustion System With Little or No Excess Oxygen, U.S. Appl. No. 12/238,612, filed Sep. 26, 2008.

(Continued)

*Primary Examiner* — Kenneth Rinehart
*Assistant Examiner* — David J Laux
(74) *Attorney, Agent, or Firm* — Michael K. Boyer

(57) ABSTRACT

A combustion system having a furnace arranged and disposed to receive solid fuel and oxygen and combust the solid fuel and oxygen to form a flue gas. The system includes a heat exchanger arrangement arranged and disposed to receive heat from the flue gas, where the heat exchanger arrangement has a predetermined heat exchange capacity. A water injection arrangement is arranged and disposed to provide water to the flue gas to controllably adjust the flue gas mass flow rate and temperature to provide the predetermined heat exchange capacity.

10 Claims, 9 Drawing Sheets

FOREIGN PATENT DOCUMENTS

WO  2008056650 A1  5/2008

OTHER PUBLICATIONS

Aleksandar Georgi Slavejkov, Combustion System With Precombustor, U.S. Appl. No. 12/238,644, filed Sep. 26, 2008.

Mark Daniel D'Agostini, Oxy/Fuel Combustion System With Minimized Flue Gas Recirculation, U.S. Appl. No. 12/238,657, filed Sep. 26, 2008.

Reed Jacob Hendershot, Convective Section Combustion, U.S. Appl. No. 12/238,671, filed Sep. 26, 2008.

Reed Jacob Hendershot, Oxy/Fuel Combustion System Having Combined Convective Section and Radiant Section, U.S. Appl. No. 12/238,695, filed Sep. 26, 2008.

Mark Daniel D'Agostini, Process Temperature Control in Oxy/Fuel Combustion System, U.S. Appl. No. 12/238,731, filed Sep. 26, 2008.

Mark Daniel D'Agostini, Oxygen Control System for Oxygen Enhanced Combustion of Solid Fuels, U.S. Appl. No. 12/138,755, filed Jun. 13, 2008.

Jeffrey William Kloosterman, Transient Operation of Oxy/Fuel Combustion System, U.S. Appl. No. 12/238,713, filed Sep. 26, 2008.

Mark Daniel D'Agostini, Combustion System With Precombustor, U.S. Appl. No. 61/100,372, filed Sep. 26, 2008.

Mark Daniel D'Agostini, Combustion System With Precombustor for Recycled Flue Gas, U.S. Appl. No. 12/566,819, filed Sep. 25, 2009.

Jost O.L. Wendt, "Oxy-Combustion of Coal-Needs, Opportunities and Challenges", Department of Chemical Engineering and Institute for Clean and Secure Energy presentation, University of Utah, May 14, 2008, 29 Pages, Park City, Utah, USA.

* cited by examiner

COMBUSTION SYSTEM WITH STEAM OR WATER INJECTION

CROSS-REFERENCE TO RELATED APPLICATIONS

This Application is related to application Ser. No. 12/238,612, entitled "OXY/FUEL COMBUSTION SYSTEM WITH LITTLE OR NO EXCESS OXYGEN", filed contemporaneously with this Application on Sep. 26, 2008, assigned to the assignee of the present disclosure and which is herein incorporated by reference in its entirety, application Ser. No. 12/238,644, entitled "COMBUSTION SYSTEM WITH PRECOMBUSTOR", filed contemporaneously with this Application on Sep. 26, 2008, assigned to the assignee of the present disclosure and which is herein incorporated by reference in its entirety, application Ser. No. 12/238,657, entitled "OXY/FUEL COMBUSTION SYSTEM WITH MINIMIZED FLUE GAS RECIRCULATION", filed contemporaneously with this Application on Sep. 26, 2008, assigned to the assignee of the present disclosure and which is herein incorporated by reference in its entirety, application Ser. No. 12/238,671, entitled "CONVECTIVE SECTION COMBUSTION", filed contemporaneously with this Application on Sep. 26, 2008, assigned to the assignee of the present disclosure and which is herein incorporated by reference in its entirety, application Ser. No. 12/238,695, entitled "OXY/FUEL COMBUSTION SYSTEM HAVING COMBINED CONVECTIVE SECTION AND RADIANT SECTION", filed contemporaneously with this Application on Sep. 26, 2008, assigned to the assignee of the present disclosure and which is herein incorporated by reference in its entirety, application Ser. No. 12/238,731, entitled "PROCESS TEMPERATURE CONTROL IN OXY/FUEL COMBUSTION SYSTEM", filed contemporaneously with this Application on Sep. 26, 2008, assigned to the assignee of the present disclosure and which is herein incorporated by reference in its entirety, and application Ser. No. 61/100,372, entitled "COMBUSTION SYSTEM WITH PRECOMBUSTOR", filed contemporaneously with this Application on Sep. 26, 2008, assigned to the assignee of the present disclosure and which is herein incorporated by reference in its entirety.

FIELD OF THE DISCLOSURE

The present disclosure is directed to a combustion system. In particular, the present disclosure is directed to an oxygen fired solid fuel combustion system with controlled water injection into the flue gas.

BACKGROUND OF THE DISCLOSURE

For an oxy/coal or oxy/fuel boiler, flue gas recycle ("FGR") is often used to moderate flame temperature and provide enough mass flow for proper heat transfer in both the radiant and the convective sections of the boiler. However, recycled flue gas ("RFG") can introduce impurities into the flue gas. In addition, the original heat transfer profile of the air fired or air/coal boiler is not adequately matched by FGR.

In a known oxy/coal combustion system, FGR is utilized to control the flame heat transfer characteristics as well as to increase mass flow through the convective section of the boiler. RFG is substantially comprised of $CO_2$. The relative radiance of $CO_2$ is lower than that of water. However, FGR reduces the purity of the $CO_2$ in the flue gas via recycling and/or building up impurities in the flue gas. These impurities typically are $N_2$ (from air ingress or contained in the coal or $O_2$ supply), Ar (from air ingress or $O_2$ supply), $SO_2$ (from coal combustion), $SO_3$ (from coal combustion), and $NO_x$ (from coal combustion), but are not only limited to only these species (e.g., some dust may be recycled as well). In the known system, air ingress is more detrimental to a $CO_2$ capture power plant than an air fired (i.e. air/fuel or air/coal combustion) power plant because the external air reduces the purity of the $CO_2$. Often, the effect of air ingress is exacerbated by flue gas recycle as the flue gas contains impurities.

Known methods of injecting water into a boiler system are not continuous and do not permit large enough flow rates. For example, soot blowers are currently used to inject $N_2$, water (liquid water or steam), or air to remove soot, slag, and/or ash deposits, but these systems are used for a short period of time to remove the particular deposits and not continuously because of the effect on plant efficiency.

Therefore, there is an unmet need to provide an oxy/fuel system and/or method reducing impurities in flue gas, better matching the original heat transfer profile of an air fired boiler, permitting control of the relative radiant and convective heat transfer, and/or increasing the overall mass flow through the convective section.

SUMMARY OF THE DISCLOSURE

This disclosure provides a combustion system having a furnace arranged and disposed to receive solid fuel and oxygen and combust the solid fuel and oxygen to form a flue gas. The system includes a heat exchanger arrangement arranged and disposed to receive heat from the flue gas, where the heat exchanger arrangement has a predetermined heat exchange capacity. A water injection arrangement is arranged and disposed to provide water to the flue gas to controllably adjust the flue gas mass flow rate and temperature to provide the predetermined heat exchange capacity.

According to an embodiment, the disclosure includes a method for operating a combustion system. The method includes providing a combustion system including a furnace configured to receive solid fuel and oxygen and a heat exchanger arrangement arranged and disposed to receive heat from the flue gas, the heat exchanger arrangement having a predetermined heat exchange capacity. Water is injected into the flue gas to provide the flue gas with a mass flow and temperature providing the predetermined heat exchange capacity.

According to another embodiment, the disclosure includes a boiler system comprising a combustion system having a furnace arranged and disposed to receive solid fuel and oxygen and combust the solid fuel and oxygen to form a flue gas, a heat exchanger arrangement arranged and disposed to receive heat from the flue gas, the heat exchanger arrangement having a predetermined heat exchange capacity, and a water injection arrangement arranged and disposed to provide water to the flue gas to provide the flue gas with a mass flow and temperature providing the predetermined heat exchange capacity. The boiler system further includes a carbon dioxide reclamation arrangement configured to remove carbon dioxide from the flue gas.

An advantage of the present disclosure is reducing or eliminating the conventional FGR for an oxy/fuel combustion boiler. By reducing or eliminating the amount of RFG, detrimental impurities such as $SO_2$ and $SO_3$ can be reduced or eliminated within the system permitting the use of conventional materials of construction to be used for the system surface areas.

Another advantage of the present disclosure is higher $CO_2$ purities in the flue gas are provided, which improves the efficiency of the $CO_2$ purification and compression system.

Yet another advantage of the present disclosure is that the water can be supplied at higher pressures than the conventional RFG (~1-5 psig) which further reduces the transport medium sizing.

Still yet another advantage of the present disclosure is that multiple injections of steam or preheated boiler feed water or water into the boiler and/or convective section may 1) desirably permit the control of the relative radiant and convective heat transfer and/or 2) desirably increase the overall mass flow through the convective section.

A further advantage of the present disclosure is better matching the original heat transfer profile of a conventional air fired boiler. For example, the mass flow rate within the boiler can be controlled to match the original air fired boiler flow rates or allow a more optimum mass flow profile within the boiler.

Another advantage of the present disclosure is desirably permitting additional control of the relative radiant and convective heat transfer.

Further aspects of the method and system are disclosed herein. The features as discussed above, as well as other features and advantages of the present disclosure will be appreciated and understood by those skilled in the art from the following detailed description and drawings.

BRIEF DESCRIPTION OF THE DRAWINGS

Wherever possible, the same reference numbers will be used throughout the drawings to represent the same parts.

DETAILED DESCRIPTION OF THE DISCLOSURE

The present disclosure now will be described more fully hereinafter with reference to the accompanying drawings, in which a preferred embodiment of the disclosure is shown. This disclosure may, however, be embodied in many different forms and should not be construed as limited to the embodiments set forth herein; rather, these embodiments are provided so that this disclosure will be thorough and complete and will fully convey the scope of the disclosure to those skilled in the art.

As used herein, the term "solid fuel" and grammatical variations thereof refers to any solid fuel suitable for combustion purposes. For example, the disclosure may be used with many types of carbon-containing solid fuels, including but not limited to: anthracite, bituminous, sub-bituminous, and lignitic coals; tar; bitumen; petroleum coke; paper mill sludge solids and sewage sludge solids; wood; peat; grass; and combinations and mixtures of all of those fuels. As used herein, the term "oxygen" and grammatical variations thereof refers to an oxidizer having an $O_2$ concentration greater than that of atmospheric or ambient conditions. As used herein, the term "oxy/coal combustion" and grammatical variations thereof refers to coal combustion in oxygen, the term "air/coal combustion" and grammatical variations thereof refers to coal combustion in air, the term "oxy/fuel combustion" and grammatical variations thereof refers to fuel combustion in oxygen, and the term "air/fuel combustion" and grammatical variations thereof refers to fuel combustion in air. As used herein, the term "combustion fluid" and grammatical variations thereof refers to a fluid formed from and/or mixed with the products of combustion, which may be utilized for convective heat transfer. The term is not limited to the products of combustion and may include fluids mixed with or otherwise traveling through at least a portion of combustion system. Although not so limited, one such example is flue gas. As used herein, the term "recycled flue gas" and grammatical variations thereof refers to combustion fluid exiting the system that is recirculated to any portion of the system. As used herein, the term "flue gas recycle" and grammatical variations thereof refers to a configuration permitting the combustion fluid to be recirculated.

Figure 1:
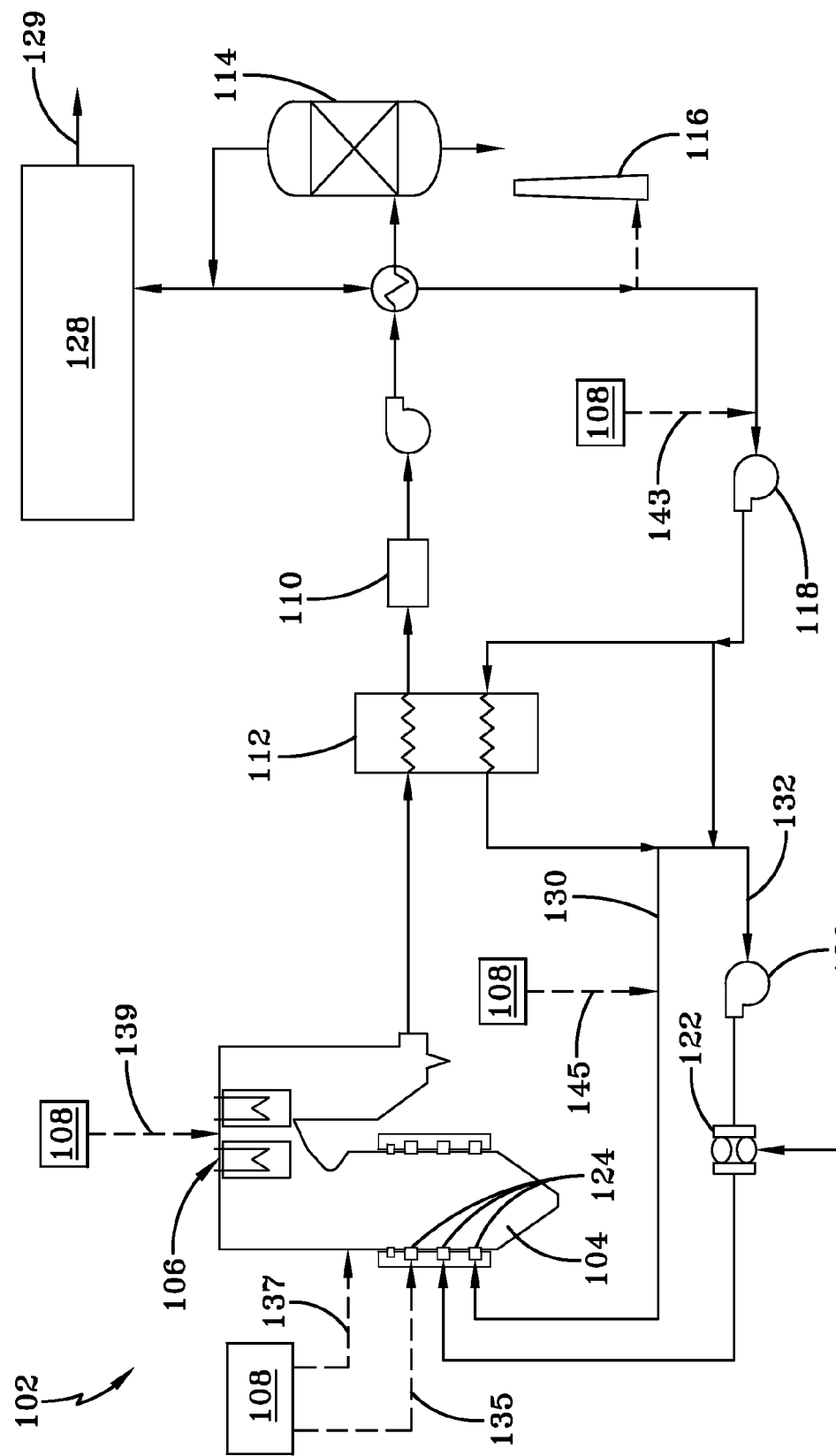
FIG. 1 illustrates a schematic view of an exemplary embodiment of a combustion system with water injection.

FIG. 1 illustrates an exemplary embodiment of a combustion system 102 according to the present disclosure. Specifically, FIG. 1 depicts the combustion system 102 as an oxygen fired coal plant or oxy/coal combustion system. Referring to FIG. 1, the combustion system 102 includes a furnace 104 and a convective section 106. The furnace 104 receives and combusts pulverized coal with oxygen to generate heat and a concomitant flue gas. While the disclosure has been described with respect to pulverized coal, other solid fuels may be utilized. The flue gas from the furnace 104 provides additional heat to the convective section 106. The convective section 106 includes a plurality of heat exchangers that remove heat from the flue gas formed in the furnace 104 (see also FIG. 2). The heat is utilized to produce and superheat steam for use in generators or other steam load sources. Within the convective 106 section, primary superheating and reheating occurs and is then followed by an economizer for final preheating of boiler feed water. It is desirable that sufficient mass flow exists within the flue gas to provide proper heat transfer via both radiation and convection. Furthermore, the temperature distribution within the flue gas preferably matches the designed heat transfer surface area to allow full utilization of the surface area and proper heating within the steam generation circuit.

In contrast to known air/coal systems, the oxygen fired coal systems or oxy/coal systems provide a higher temperature in the furnace 104 and lower mass flow rate for the flue gas. Controlled amounts of recycled flue gas ("RFG") and water or water alone may be used to increase the mass flow rate and provide the desired heat transfer in the convective section 106. In the embodiment illustrated by FIG. 1, the furnace 104 is capable of receiving water, either in liquid or gaseous form from a water source 108. The water may be provided by any suitable method, such as injectors, conveyors, openings or other known water or steam providing devices. The convective section 106 likewise is capable of receiving water from the water source 108. In one embodiment, the water source 108 for the individual injection points may be the same source or different sources. The term "water" as used herein for injection into flue gas includes steam, vapor, liquid or any other form of water, and combinations thereof. In addition, "water" may include impurities or entrained materials. In particular, water may include, for example, dissolved gases or acidic components associated with flue gas condensation.

Water may be injected into various locations within the combustion system 102. For example, water may be added to the furnace 104, convective section 106 (see also FIG. 2), RFG prior to the forced draft fan 118, secondary and/or support gas 130. The water injection may be individually controlled and one or more of the injection points may be omitted. Specifically, as shown in FIG. 1, water injection points include, but are not limited to, burner water injector 135, over-fire water injector 137, convection section water injectors 139, recycle water injector 143, support gas water injector 145. Beyond injection of water and increased mass flow, the burner water injector may reduce the flame temperature. The support gas, over-fire and convection section water injectors result in increased flue gas mass flow. Beyond injection of water and increased mass flow, the recycle water injector allows for preheating of the water ladened RFG in the support gas preheater 112. Water injection may be provided at any point in the combustion system 102 that provides the desired flue gas temperature profile and mass flow rate. While the above has been described with respect to "injection", the water may be provided in any suitable manner, including but not limited to liquid injection, gas injection, open conduit, pressure valve or any other method for providing liquid or vapor to a flue gas stream.

The exemplary embodiment illustrated by FIG. 1 further includes an electrostatic precipitator 110, a support gas preheater 112, a flue gas desulfurization unit 114, a stack 116, a forced draft fan 118, and a primary support gas fan 120. As illustrated, the combustion system 102 is configured to permit flue gas to exit the convective section 106.

As illustrated in FIG. 1, the combustion system 102 is configured to permit the flue gas, upon exiting the support gas preheater 112, to undergo dust removal via the electrostatic precipitator 110 followed by sulfur removal in the flue gas desulfurization unit 114 where $SO_2$ is removed. In certain embodiments of the present disclosure, the flue gas exiting the flue gas desulfurization unit 114 is recycled as RFG to the furnace 104. The RFG may be utilized to assist in providing desired flame characteristics and/or temperature. The increase mass flow with the RFG moderates the flame temperature by decreasing the average flame temperature. RFG can also lengthen the time to mix the oxidant and fuel, which may also effect the emissions and radiance of the flame. While not required for mass flow in accordance with the disclosure, the RFG may be utilized to increase the mass flow of the flue gas to provide increased heat transfer in the convective section 106. The remainder of the flue gas exiting the desulfurization unit 114 is sent to the $CO_2$ purification unit 128. The $CO_2$ purification unit 128 may utilize any known $CO_2$ purification/compression method and may include known, conventionally available $CO_2$ purification/compression equipment.

Since oxygen is utilized to combust the coal or other solid fuel, nitrogen in the flue gas is reduced or eliminated, in contrast to air/coal combustion system. Thus, most or all of the nitrogen is eliminated from the system resulting in flue gas having a high concentration of $CO_2$ product 129. This enrichment in $CO_2$ may permit easier capture of the $CO_2$ for purification and compression. The $CO_2$ product 129 can be used for enhanced oil recovery (EOR) or sequestration, among other things. A byproduct of $CO_2$ compression includes water, which may be utilized as water source 108 or may supplement water source 108 (see e.g., FIG. 4).

The combustion system 102 may also permit the flue gas from the desulfurization unit 114 to exit the system 102 via the stack 116 into the atmosphere. As illustrated in FIG. 1, RFG for recycle to the furnace 104 may be supplied by the forced draft fan 118 and preheated by the support gas preheater 112. The primary support gas fan 120 utilizes a portion of the RFG and acts as a carrier of coal from a fuel source 126 to transport it to a fuel pulverizer 122 and eventually to burners 124. The support gases and RFG are preferably substantially free of nitrogen and/or air. Coal combustion occurs at the coal burners 124, where a stream of secondary support gas 130 may also be supplied. The stream of secondary support gas 130 is similarly supplied by the forced draft fan 118 and preheated by the support gas preheater 112 prior to being supplied to the coal burners 124. Oxygen may be utilized as the support gas, wherein the oxygen is added to or replaces the RFG. The oxygen may be added from any suitable source. Suitable oxygen sources may comprise a system including cryogenic separation of air to produce oxygen (in various purities) and other by-products (typically, nitrogen and argon). The product oxygen from the oxygen source can be either gaseous or liquid in form. Alternatively, oxygen can be generated via a pressure swing/vacuum swing operation over adsorbent beds. Other processes, such as membrane-based systems, including ion transport membranes, can also produce an oxygen predominant stream. Likewise, the oxygen may be added at any suitable location in the system 102, including into the primary support gas 132, the secondary support gas 130, the burner 124, the furnace 104 or any other location that supports combustion of the solid fuel.

As illustrated in FIG. 1, the stream of secondary support gas 130 may be supplied to the primary support gas 132 at varying points. This increased flexibility of the injection of the secondary support gas 130 provides a means of adding more support gas, such as oxygen, to the primary support gas 132 and provides the ability to include a bypass of the preheater for the primary support gas 132.

Figure 2:
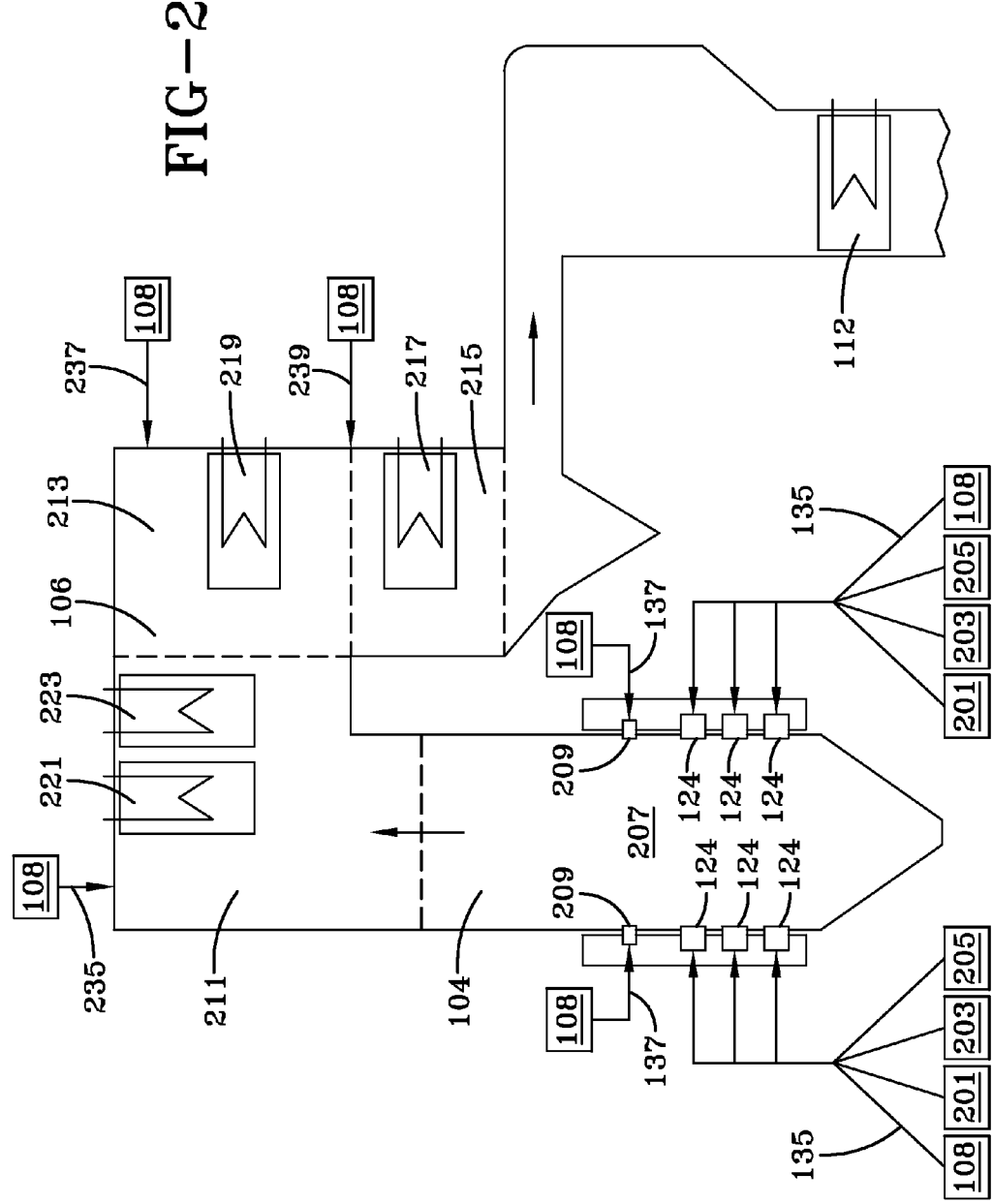
FIG. 2 illustrates an enlarged schematic view of a portion of the combustion system according to an embodiment of the present disclosure.

As shown in greater detail in FIG. 2, the furnace 104 is provided with controlled amounts of oxygen from an oxygen source 201, solid fuel 203, which preferably pulverized, from a pulverizer 122 or other source, optional RFG 205 and optional water injection from a water source 108. The support gases and fuel 203 are provided to burners 124 and are combusted in a radiant chamber 207 to form combustion products, including flue gas. Heat exchangers (not shown in FIG. 1) may be arranged within the radiant chamber 207 to receive heat from the flue gas and the radiant heat emitted from the combustion. Over-fire injectors 209 may provide additional support gas, such as oxygen, or may provide water injection. In one embodiment, the flue gas formed in the radiant chamber 207 is expelled into the convective section 106. The convective section 106 includes a secondary superheating/reheat zone 211, a primary superheater zone 213 and an economizer zone 215. As will be appreciated by one of ordinary skill in the art, numerous other configurations may be included. In addition, the size and geometries of the zones 211, 213, 215 is merely schematic and may vary from those shown in FIG. 2.

Water may be injected into various locations within the furnace 104 and convective section 106. For example, water may be added to the furnace 104 via the burner water injector 135 or the over-fire water injector 137. In addition, the convective section 106 further includes a secondary superheat/reheat water injector 235, a primary superheat water injector 237 and an economizer water injector 239. As discussed above with respect to FIG. 1, the water injection may be individually controlled and one or more of the injection points may be omitted. Further, water injection may be provided at any point in the furnace 104 and/or convective section 106 that provides the desired flue gas temperature profile and mass flow rate.

To provide steam suitable for generation of electricity at a generator by use of a steam turbine, water is first preheated by an economizer 217. The economizer 217 is a heat exchanger that exchanges heat from the flue gas passing through the economizer zone 215. Preheated water is then heated by radiant heat in the radiant chamber 207 or other source and permitted to vaporize into steam. For example, a heat exchanger may be disposed in the radiant chamber 207 to receive the radiant heat resulting from combustion. The arrangement that vaporizes the water to steam may include any known arrangement known in the art.

The steam that is formed is provided to the primary superheater 219, wherein the steam is superheated by the exchange of heat with the flue gas in the primary superheater zone 213. The steam is then further superheated in the secondary superheater 221 by exchange of heat with the flue gas in the secondary superheating/reheat zone 211. The superheated water leaving the secondary superheater 221 may be fed to a high pressure turbine (not shown in FIG. 2) or other high pressure device to extract energy and/or power from the superheated steam. The steam from the high pressure turbine is returned to a reheater 223, which reheats the steam in the reheater 223 by exchange of heat with the flue gas in the secondary superheating/reheat zone 211. The steam is then returned to intermediate or low pressure turbines for additional extraction of energy and/or power. The steam is condensed to liquid water and the water is fed back to the economizer 217 to repeat the cycle. The economizer, 217, the primary superheater 219, the secondary superheater 221 and the reheater 223 may be any suitable heat exchange device, including, but not limited to tube heat exchangers, plate heat exchangers or other types of heat exchangers known in the art for boiler or furnace systems. The present disclosure is not limited to above arrangement, and may include alternate arrangements of heat exchangers, generators and/or water/steam flow. The flue gas continues through the combustion system and may exchange heat and preheat the support gas being provided to the furnace 104 at support gas preheater 112 and continues to the electrostatic precipitator 110, as shown in FIG. 1.

Controllably providing water to the flue gas permits control of relative radiant and convective heat transfer. In particular, the selective addition of water provides control over the overall mass flow and the temperature through the convective section 106. The heat exchange in the convective section 106 may be sufficiently controlled to equal or exceed the heat exchange capacity or designed heat exchange of a flue gas formed by combustion in the presence of air.

Further, the controlled mass flow rate and temperature permits the reduction or elimination of flue gas recycle. Further, the reduction or elimination of air and/or nitrogen-bearing gas permitting a higher purity $CO_2$ product 129 because the difficult, energy intensive separation of nitrogen from the $CO_2$ is reduced or eliminated.

Figure 3:
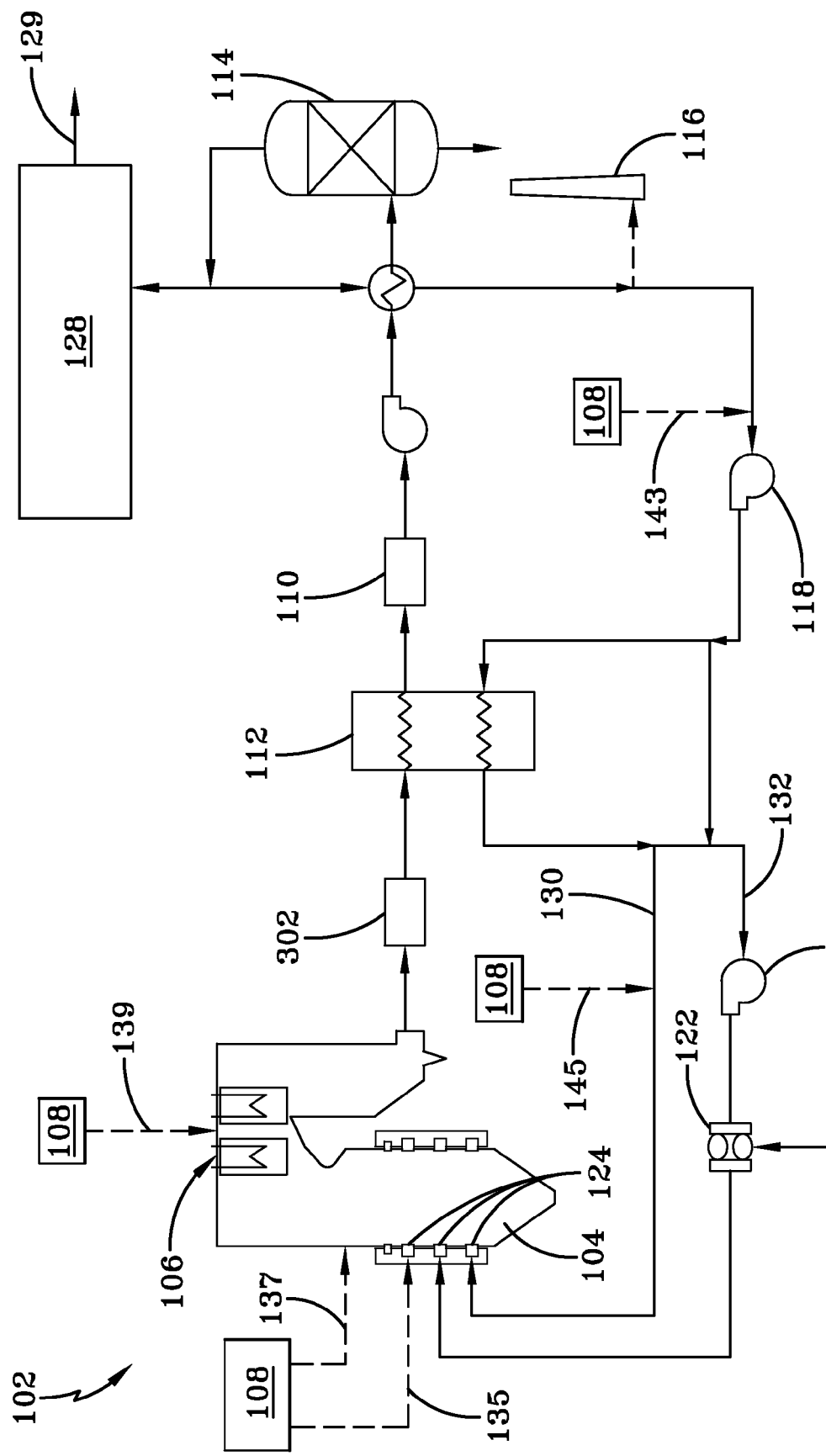
FIG. 3 illustrates a schematic view of an exemplary embodiment of the combustion system with a selective catalytic reduction unit.

FIG. 3 includes an arrangement of combustion system 102 substantially identical to the arrangement shown in FIG. 1. However in FIG. 3, upon completing travel through the convective section 106, in another embodiment of the disclosure illustrated by FIG. 3, the flue gas undergoes $DeNO_x$ in a selective catalytic reduction unit 302 followed by cooling with the support gas preheater 112 (e.g., Lungstrom type rotary unit). However, it is noted that in the embodiment illustrated by FIG. 1, the $DeNO_x$ (i.e., the selective catalystic reduction unit 302) is unnecessary due to the use of substantially nitrogen-free water in the combustion system 102 thereby reducing RFG and, thus, the selective catalytic reduction unit 302 may be omitted. In the embodiment of FIG. 1, the selective catalytic reduction unit 302 may be eliminated because $NO_x$ will not be released to the atmosphere, rather the $NO_x$ will remain with the $CO_2$ going to a $CO_2$ purification unit 128.

As a result of the water addition, the amount of RFG can be reduced or eliminated. Thus, the recycle rate of this embodiment is less than or equal to the conventional recycle rate of an oxy/fuel or oxy/coal boiler for power.

Figure 4:
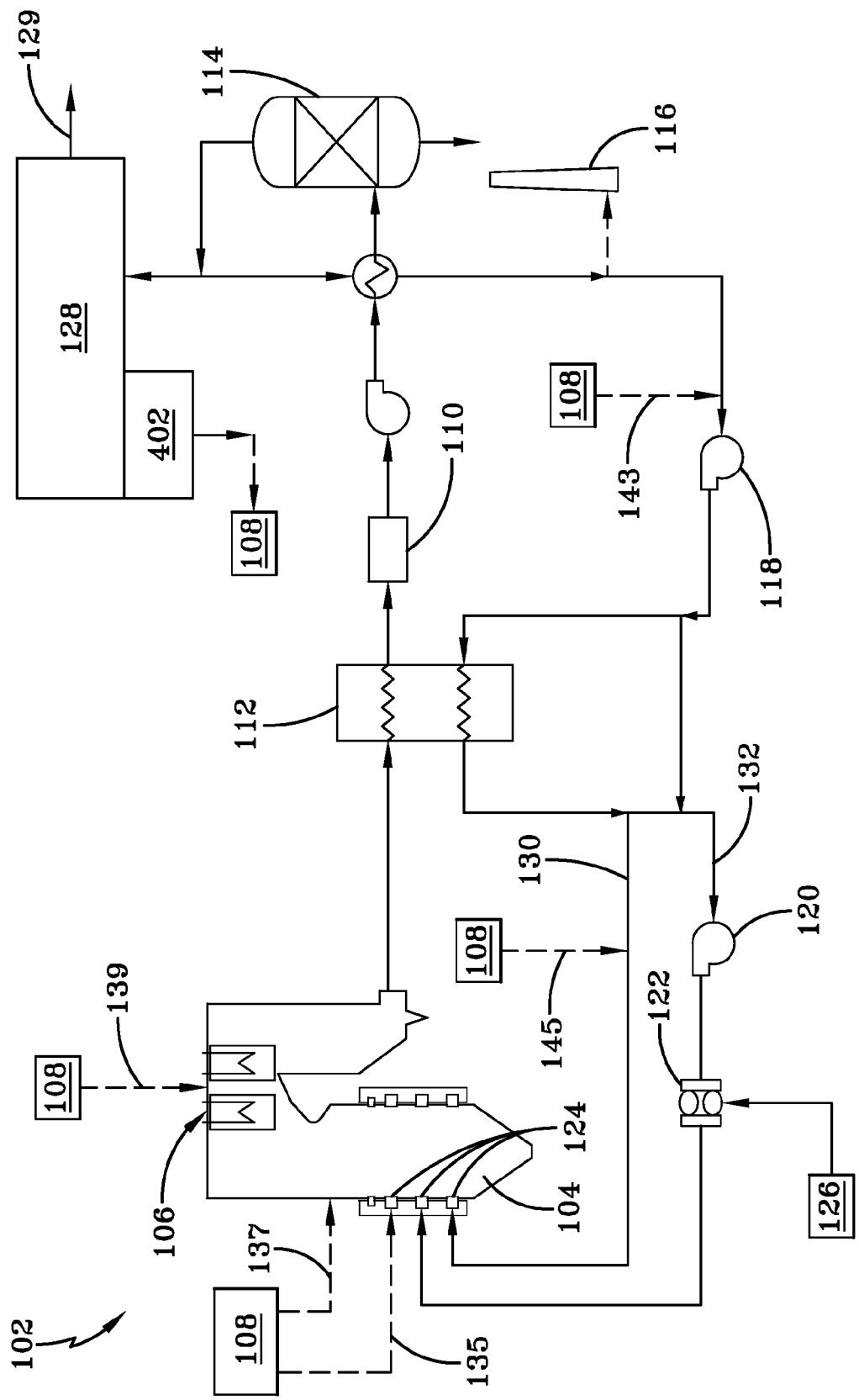
FIG. 4 illustrates a schematic view of the exemplary embodiment of the combustion system with a flue gas condenser within a $CO_2$ purification system.

FIG. 4 includes an arrangement of combustion system 102 substantially similar to the arrangement shown in FIG. 1. However, as illustrated in FIG. 4, in one embodiment, the water source 108 may be a flue gas condenser 402 within the $CO_2$ purification system. The liquid bottoms (substantially water) of the flue gas condenser 420 may be injected as water. In yet another embodiment, the liquid bottoms may be heated by the support gas preheater 112 or another heat source prior to being injected into the combustion system 102.

EXAMPLE

Figure 5:
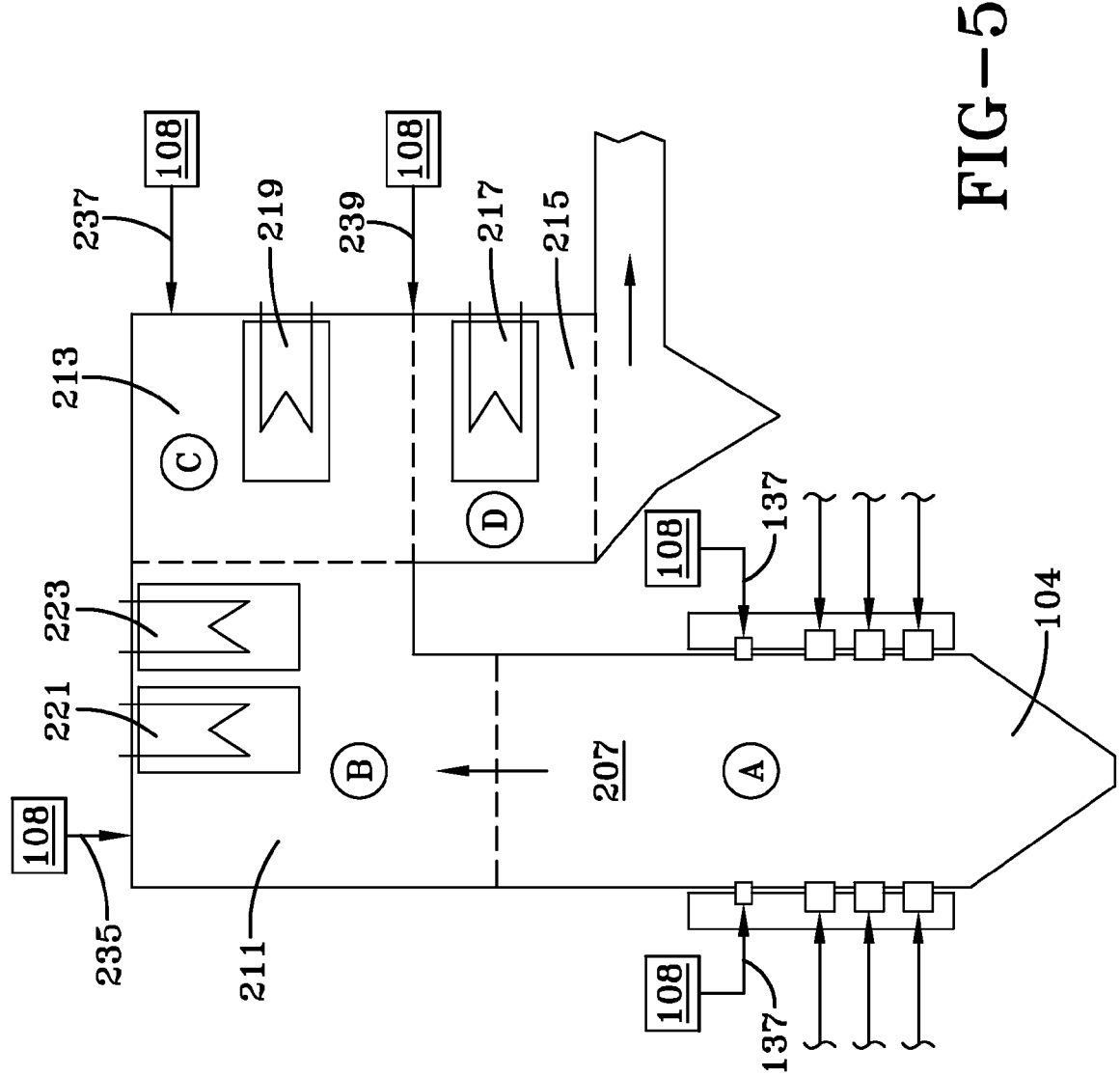
FIG. 5 illustrates an enlarged schematic view of a portion of a combustion system according to an embodiment of the disclosure.

FIG. 5 shows a representative boiler with four zones (A, B, C, and D). Zone A represents the furnace 104. Zone B represents the secondary superheater and reheater, corresponding to the secondary superheating/reheat zone 211. Zone C represents the primary superheater and reheater, corresponding to the a primary superheater zone 213. Zone D represents the economizer section of the overall boiler, corresponding to an economizer zone 215. Each zone A, B, C and D is encompassed by a dotted line. Table 1 details the analysis of a high volatile bituminous coal. Table 2 shows the absorbed heat duty for each zone outlined in FIG. 5. Table 3 shows the zonal heat and material balances for the different process configurations for the coal combustion defined in Table 1 and 2.

TABLE 1

Coal Characteristics for a Typical High Volatile Bituminous Coal

| | | |
|---|---|---|
| Proximate Analysis, | $H_2O$ | 2.5 |
| wgt % | Volatile Matter | 37.6 |
| | Fixed Carbon | 52.9 |
| | Ash | 7 |
| Ultimate Analysis, | $H_2O$ | 2.5 |
| wgt % | C | 75 |
| | $H_2$ | 5 |
| | S | 2.3 |
| | $O_2$ | 6.7 |
| | $N_2$ | 1.5 |
| HHV, BTU/lb | | 13000 |

Table 2 shows the absorbed heat duty for each zone outlined in FIG. 5 for a nominal 350 MW supercritical pulverized coal boiler. Other heat absorption duties could be utilized, but for all the examples described below, the zonal heat absorption duties were fixed. Importantly, this illustrates the impact of different configurations on the flue gas mass flow and temperature.

TABLE 2

| Zone | Description | Absorbed Duty |
|---|---|---|
| A | Radiant Boiler | 1200 MMBtu/h |
| B | Final Superheater & Reheater | 500 MMBtu/h |
| C | Primary Superheater & Reheater | 500 MMBtu/h |
| D | Economizer | 500 MMBtu/h |

Table 3 shows the zonal heat and material balances for the different process configurations for the coal combustion defined in Table 1 and 2. The first example is an air fired combustion boiler for power. The peak temperature of the flue gas within the zone is shown in the table. The flue gas is cooled via heat absorption and exits the zone at about 2259° F. (1237° C.). Further heat transfer between the water/steam and flue gas occurs in zones B, C, and D respectively with the exiting flue gas temperature from zone D at 718° F. (381° C.) boiler feed water is fed to the economizer to be preheated before boiling. The heat required for preheating the boiler feed water may be supplied elsewhere, but normally the final preheating is done in an economizer as represented by zone D where the supplied heat is from the flue gas. The incoming boiler feed water is supplied at 3500 psia and 504° F. (262° C.). Hence, because a positive heat transfer temperature difference is needed between the flue gas and the boiler feed water within the economizer, the flue gas temperature exiting zone D must be above 504° F. (262° C.). A flue gas mass flow rate of $3.3 \times 10^6$ lbs/h was achieved in the air example. For the "Full FGR" case, the air flow was removed and replaced with $O_2$ and a flow of $2.65 \times 10^6$ lbs/h of RFG (primarily $CO_2$ and $H_2O$) within zone A. For the "Half FGR" case, the air flow was removed and replaced with $O_2$ and a flow of $1.33 \times 10^6$ lbs/h of RFG (primarily $CO_2$ and $H_2O$) within zone A. For the "Full FGR" case, the air flow was removed and replaced with $O_2$ and a flow of $2.65 \times 10^6$ lbs/h of RFG (primarily $CO_2$ and $H_2O$) within zone A. For the "No FGR with injection" case, the air flow was removed and replaced with $O_2$ and water was injected into different zones of the boiler as described in Table 3. For the "Half FGR with injection A or B or C" case, the air flow was removed and replaced with $O_2$ and a flow of $1.33 \times 10^6$ lbs/h of RFG (primarily $CO_2$ and $H_2O$) within zone A and water was injected into different zones of the boiler as described in Table 3 for those respective cases.

TABLE 3

| Example | Air (comparative) | Full FGR (comparative) | Half FGR (comparative) | No FGR with injection | Half FGR with injection A | Half FGR with injection B | Half FGR with injection C |
|---|---|---|---|---|---|---|---|
| Peak Temperature in Zone A, F. | 3391 | 2777 | 3710 | 3622 | 3369 | 3481 | 3481 |
| Temperature Exiting, F. | | | | | | | |
| Zone A | 2259 | 1925 | 2439 | 2462 | 2292 | 2348 | 2348 |
| Zone B | 1769 | 1554 | 1885 | 1804 | 1698 | 1721 | 1784 |
| Zone C | 1260 | 1165 | 1303 | 1226 | 1173 | 1207 | 1246 |
| Zone D | 718 | 750 | 669 | 518 | 618 | 604 | 616 |
| Mass flow rate, lb/h | | | | | | | |
| Zone A | 3.30E+06 | 3.88E+06 | 2.55E+06 | 2.13E+06 | 2.82E+06 | 2.73E+06 | 2.73E+06 |
| Zone B | 3.30E+06 | 3.88E+06 | 2.55E+06 | 2.31E+06 | 3.00E+06 | 2.91E+06 | 2.82E+06 |
| Zone C | 3.30E+06 | 3.88E+06 | 2.55E+06 | 2.49E+06 | 3.18E+06 | 3.00E+06 | 2.91E+06 |
| Zone D | 3.30E+06 | 3.88E+06 | 2.55E+06 | 2.67E+06 | 3.27E+06 | 3.09E+06 | 3.00E+06 |
| FGR flow, lb/h | 0.00E+00 | 2.65E+06 | 1.33E+06 | 0.00E+00 | 1.33E+06 | 1.33E+06 | 1.33E+06 |
| H2O injection, lb/h | | | | | | | |
| Zone A | 0 | 0 | 0 | 9.01E+05 | 2.70E+05 | 1.80E+05 | 1.80E+05 |
| Zone B | 0 | 0 | 0 | 1.80E+05 | 1.80E+05 | 1.80E+05 | 9.01E+04 |
| Zone C | 0 | 0 | 0 | 1.80E+05 | 1.80E+05 | 9.01E+04 | 9.01E+04 |
| Zone D | 0 | 0 | 0 | 1.80E+05 | 9.01E+04 | 9.01E+04 | 9.01E+04 |
| Injected H2O temperature, ° F. | | | | | | | |
| Zone A | N/A | N/A | N/A | 350 | 350 | 350 | 350 |
| Zone B | N/A | N/A | N/A | 350 | 350 | 350 | 350 |
| Zone C | N/A | N/A | N/A | 350 | 350 | 350 | 350 |
| Zone D | N/A | N/A | N/A | 190 | 190 | 190 | 190 |

As shown in Table 3, the full FGR example has a lower peak temperature and flue gas temperature profile than the comparative example (i.e., an air fired flue gas) as the mass flow rate is higher in the full FGR example than the air example. For the half FGR example, the RFG is reduced by half and both the peak temperature and the flue gas temperatures increased until zone D. However, the flue gas mass rate was lower than the air example. Hence, the lower mass flow resulted in a lower temperature exiting zone D: 669° F. (354° C.).

However with water injection as described in this disclosure, a solution is found. By injecting water into zone A, B, C, or D, the mass flow rate is increased enough that the economizers provide sufficient boiler feed water preheated as shown by the flue gas temperature exiting zone D at 518° F., which is greater than the 504° F. (262° C.) boiler feed water inlet temperature. Several configurations of water injection are possible. Table 3 shows one configuration with superheated steam (350° F./177° C., 50 psig) supplied to zones A, B, and C and boiler feed water (190° F./88° C., 50 psig) supplied to zone D.

Figure 6:
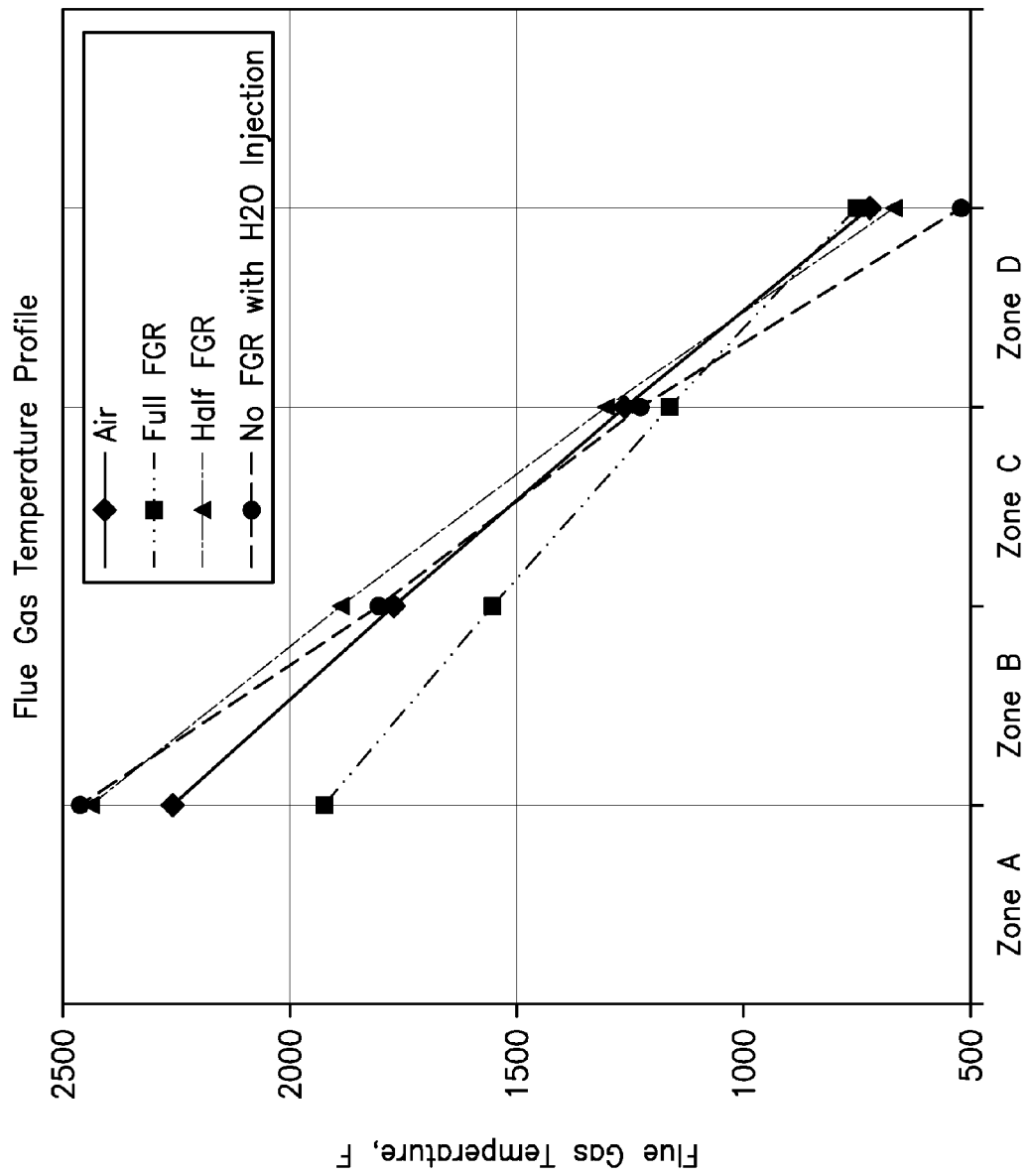
FIG. 6 graphically illustrates the effect that flue gas recycle has on flue gas temperature exiting from each zone.

FIG. 6 details the effect that FGR has on flue gas temperature exiting from each zone. Neither the full FGR nor half FGR examples temperature profiles matched the air comparative example profile. The water injection example with no RFG temperature profile is similar to the half FGR example profile.

Figure 7:
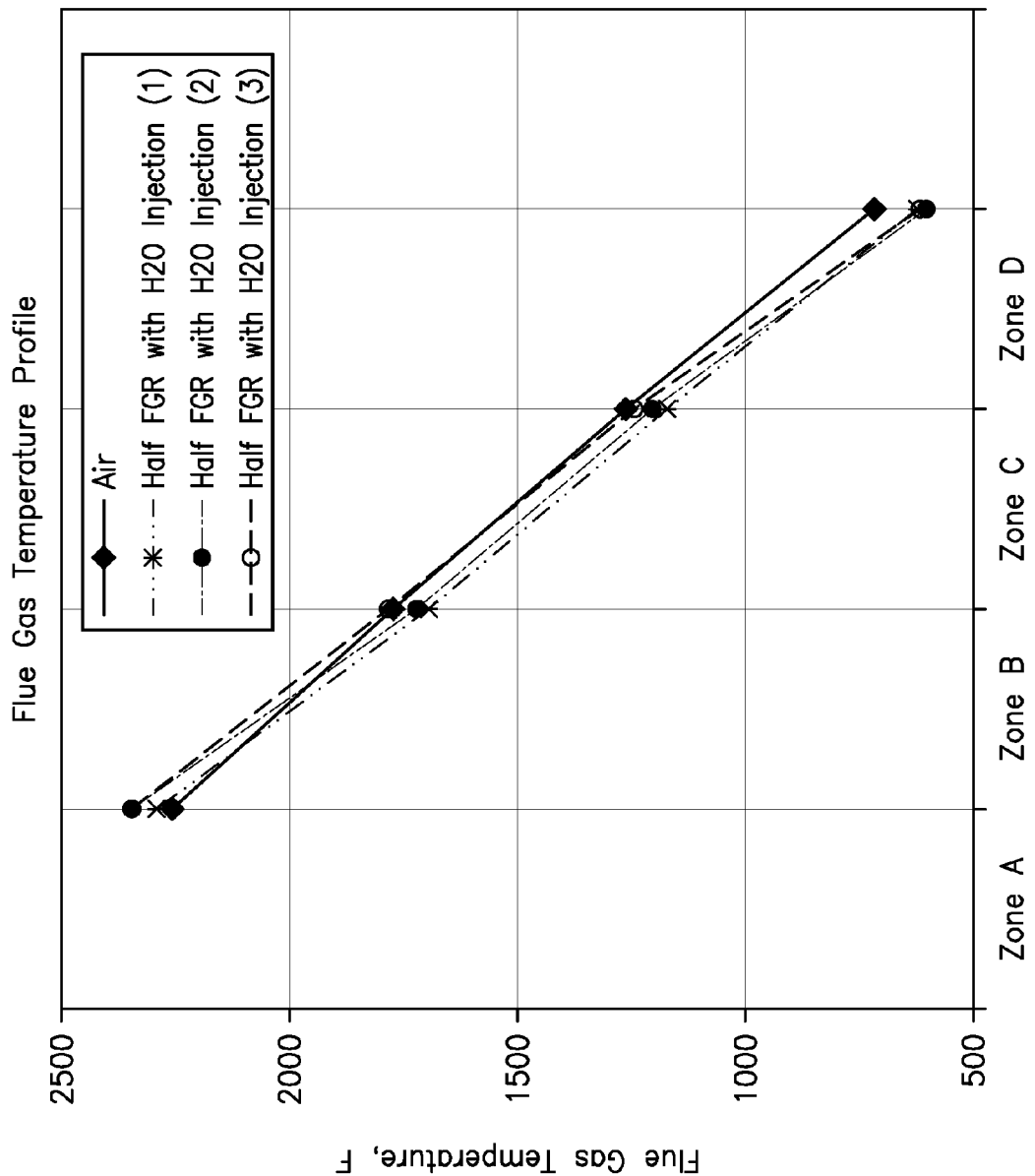
FIG. 7 graphically illustrates the effect that water injection has on flue gas temperature exiting from each zone.

Also, as shown in Table 3, water injection as detailed by the disclosure could also be used with a reduced FGR. Similar water injection temperatures were used as described above [superheated steam (350° F./177° C., 50 psig)] supplied to zones A, B, and C and boiler feed water [(190° F./88° C., 50 psig) supplied to zone D], but with different water flow rates. With half FGR flow rate and the water injection "A", the peak flue gas temperature in zone A was reduced and flue gas temperature exiting zone D increased. Thus, the flue gas temperature profile could be manipulated to achieve the optimum pattern for heat transfer. The water injection examples ("B" and "C") show how the temperature profile can be refined via adjustment in the water injection. FIG. 7 details the effect that water injection has on flue gas temperature exiting from each zone.

Figure 8:
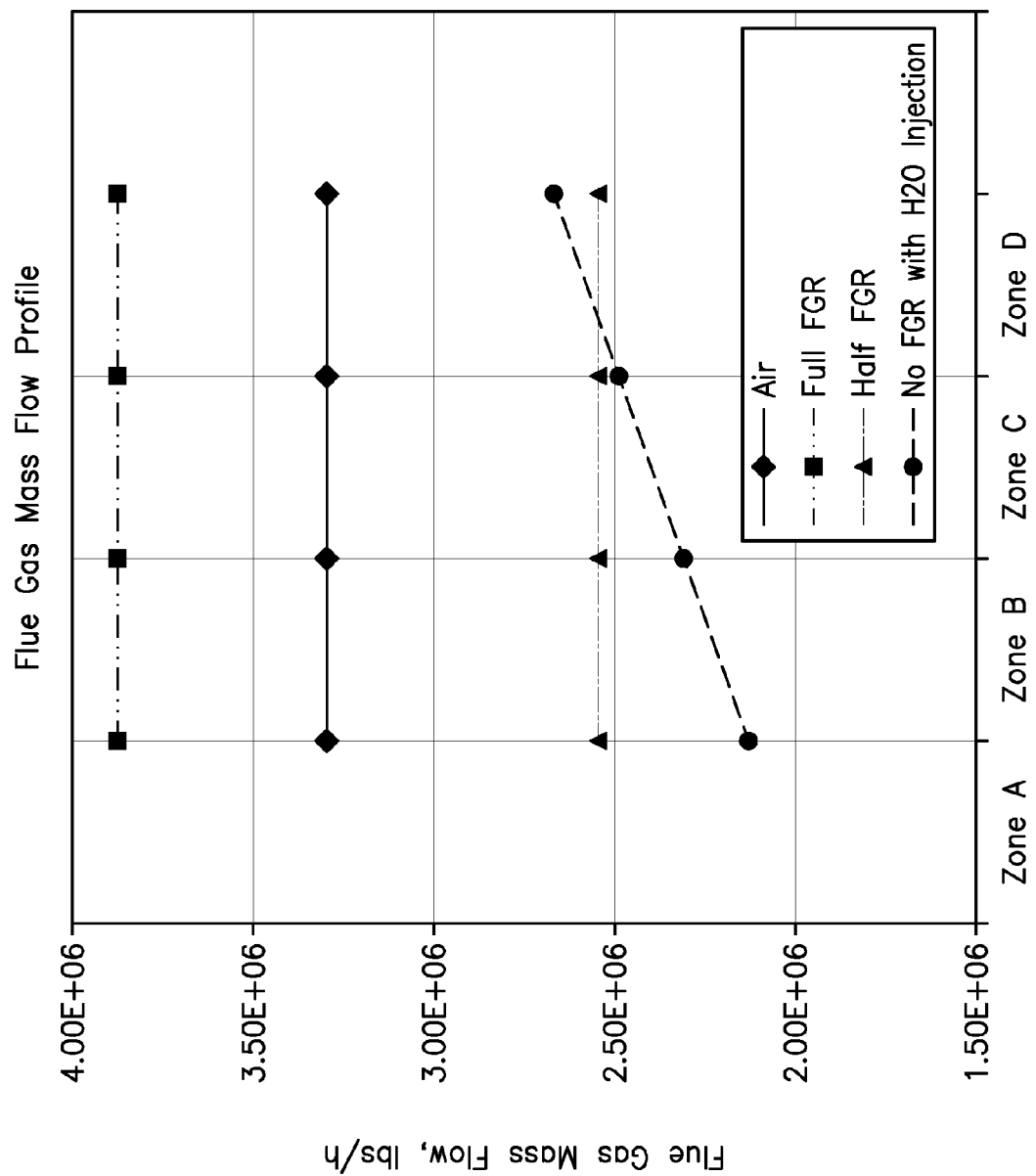
FIG. 8 graphically illustrates the effect that flue gas recycle has on flue gas mass flow from each zone.
Figure 9:
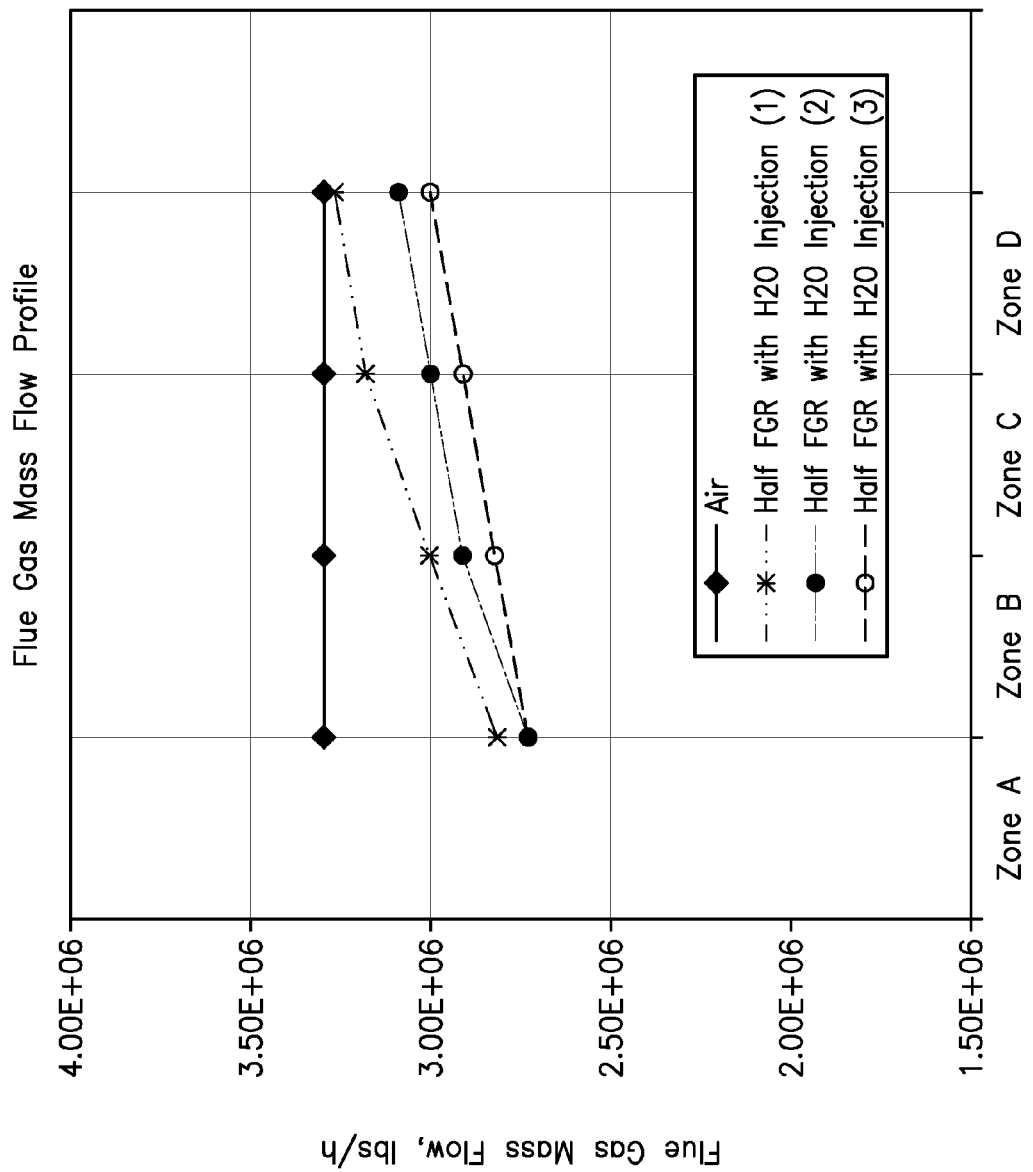
FIG. 9 graphically illustrates the effect of water injection with a reduced rate flue gas recycle.

FIG. 8 details the effect that FGR has on flue gas mass flow from each zone. So while the full FGR example has a higher mass flow than the air example, the temperature profile is lower until zone D as shown in FIG. 7. A mass flow rate similar to the air example with a similar flue gas temperature profile, given the original boiler was designed for air firing, is desired. The half FGR example has a lower mass flow, but a similar flue gas temperature profile. Other RFG rates may match the air example flue gas mass flow rate, but the temperature profiles may not match. The disclosure allows for additional means to match both the flue gas flow rate and the temperature profile. In FIG. 8, the "no FGR" with water injection has a flue gas flow rate too low. However, as shown in FIG. 9, the effect of water injection with a reduced rate FGR does approach the air example flue gas flow rate. In addition, as shown in FIG. 7, the flue gas temperature profiles with water injection are very similar with the air example.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method for operating a combustion system comprising:
   providing a combustion system including a furnace configured to receive solid fuel and oxygen and a heat exchanger arrangement arranged and disposed to receive heat from a flue gas, the heat exchanger arrangement having a predetermined heat exchange capacity; wherein the heat exchanger arrangement includes one or more of a superheater, reheater, and economizer;
   controllably injecting water into the flue gas to provide the flue gas with a mass flow and temperature providing the predetermined heat exchange capacity and wherein the water injection arrangement includes water injectors disposed in at least two of the furnace, the superheater, the reheater and the economizer.

2. The method of claim 1, wherein the flue gas is not recycled to the furnace.

3. The method of claim 1, wherein the predetermined heat exchange capacity is equal to or greater than the heat exchange capacity from a second flue gas formed from combustion of solid fuel with air.

4. The method of claim 1, wherein the solid fuel is coal.

5. The method of claim 1 wherein the combustion system comprises:
   a furnace arranged and disposed to receive solid fuel and oxygen and combust the solid fuel and the oxygen to form a flue gas;
   a heat exchanger arrangement arranged and disposed to receive heat from the flue gas, the heat exchanger arrangement having a predetermined heat exchange capacity; wherein the heat exchanger arrangement includes one or more of a superheater, reheater, and economizer; and
   a water injection arrangement arranged and disposed to provide water to the flue gas to controllably adjust the flue gas mass flow rate and temperature to provide the predetermined heat exchange capacity and wherein the water injection arrangement includes water injectors disposed in at least two of the furnace, the superheater, the reheater and the economizer.

6. The method of claim 1, wherein the system is substantially devoid of recycled flue gas.

7. The method of claim 5 wherein the combustion system further comprises
   a carbon dioxide reclamation arrangement configured to reclaim carbon dioxide from the flue gas.

8. The method of claim 7, wherein the carbon dioxide reclamation arrangement produces high purity carbon dioxide.

9. The method of claim 5, wherein the predetermined heat exchange capacity is equal to or greater than a heat exchange capacity from a second flue gas formed from combustion of the solid fuel with air.

10. The method of claim 5, wherein the heat exchanger arrangement includes a convective section of a boiler.

* * * * *